(12) United States Patent
Wang

(10) Patent No.: US 6,690,535 B2
(45) Date of Patent: Feb. 10, 2004

(54) USING COMPONENT POSITION ERROR SIGNALS (PES) TO MEASURE TAPE DISTORTION

(75) Inventor: Linus Tsung-Shu Wang, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 433 days.

(21) Appl. No.: 09/751,575

(22) Filed: Dec. 29, 2000

(65) Prior Publication Data

US 2002/0085304 A1 Jul. 4, 2002

(51) Int. Cl.⁷ .............................................. G11B 5/584
(52) U.S. Cl. ........................ 360/77.12; 360/25; 360/31
(58) Field of Search ............................. 360/25, 31, 77, 360/12; 714/25, 48, 704

(56) References Cited

U.S. PATENT DOCUMENTS

| | | | | |
|---|---|---|---|---|
| 4,549,295 A | * | 10/1985 | Purvis | ........................ 714/48 |
| 4,951,282 A | * | 8/1990 | Mester | ........................ 714/704 |
| 5,173,815 A | * | 12/1992 | Iwaki et al. | ................... 360/54 |
| 6,025,967 A | * | 2/2000 | Kuta et al. | ..................... 360/69 |
| 6,243,225 B1 | * | 6/2001 | Wyman et al. | .......... 360/77.12 |

* cited by examiner

Primary Examiner—David Hudspeth
Assistant Examiner—K. Wong
(74) Attorney, Agent, or Firm—Carstens, Yee & Cahoon, LLP

(57) ABSTRACT

A method, system and program for measuring magnetic tape track distortion are provided. The invention comprises defining specifications for tape track distortion acceptability and using tape head servo readers to collect component position error signal (PES) data from servo tracks on a magnetic tape. The separate PES data are analyzed to determine tape distortion. The data can also be adjusted for reliability factors that might affect the confidence of the PES data. The distortion data for the tape is then compared to the defined specifications and a determination is made as to whether the tape meets acceptability standards.

21 Claims, 4 Drawing Sheets

USING COMPONENT POSITION ERROR SIGNALS (PES) TO MEASURE TAPE DISTORTION

BACKGROUND OF THE INVENTION

1. Technical Field

The present invention relates generally to an improved data processing system and in particular to a method and apparatus for accessing data on a storage device. Still more particularly, the present invention relates to a method and apparatus for accessing data on storage media in the form of a tape.

2. Description of Related Art

Tape drives are peripheral mass storage devices often used to archive data on tapes for later access. Tape drives are also used as random access devices in data storage applications where cost of storage might be important and access time is of less significance. For example, many banks and financial institutions, insurance companies, and government agencies may use tape drives with applications regarding clients, accounts, patients, and other items of interest. In other applications, huge amounts of data are stored directly on tape for later retrieval and analysis.

In accessing data on a tape, a read or write head in a tape drive is positioned over one or more tracks on the tape. A servo track may be used for aligning the read or write head to the tracks containing the data. If the read or write head drifts from an optimal position relative to the track on the tape, an error signal is generated. The error signal increases as the read or write head drifts further from the optimal location relative to the data on the track on the tape. If the read or write head drifts too far relative to the data on the track, errors and data recovery problems occur in accessing the tape. Presently available systems adjust the position of the read or write head or the position of the tape relative to the read or write head to minimize the error signal generated during access of the tape.

Evidence indicates that, over time, tape dimensions are distorted over the length of the tape. In addition, tape distortion can worsen with a combination of time, temperature, and use. Three primary problems result from tape distortion. First, the data tracks on the tape can shift position relative to the data readers, resulting in the loss or overwriting of data. Second, distorted servo tracks can degrade the ability of the tape servo system to acquire and follow the servo tracks, resulting in degraded performance. Third, tape distortion requires the costly development of robustness in the tape drive, which would allow the servo system to handle tapes that exceed distortion specifications.

In addition, as data tracks become narrower in the future, the margins of error in tape distortion will decrease even further.

Therefore, it would be desirable to have a method for detecting tape distortions that exceed established specifications.

SUMMARY OF THE INVENTION

The present invention provides a method, system and program for measuring magnetic tape track distortion. The invention comprises defining specifications for tape track distortion acceptability and using tape head servo readers to collect component position error signal (PES) data from servo tracks on a magnetic tape. The separate PES data are analyzed to determine tape distortion. The data can also be adjusted for reliability factors that might affect the confidence of the PES data. The distortion data for the tape is then compared to the defined specifications and a determination is made as to whether the tape meets acceptability standards.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
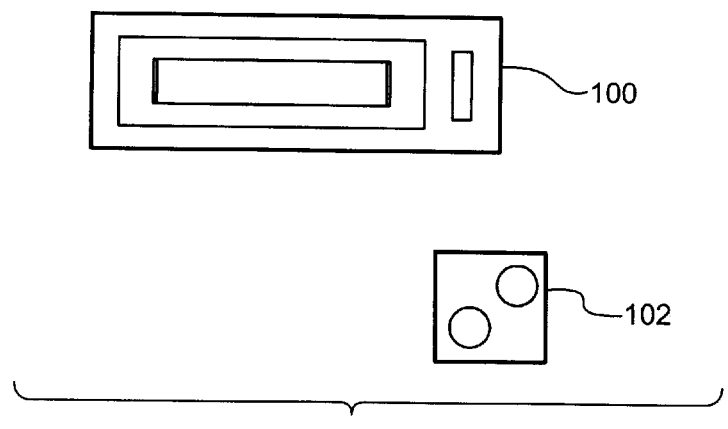
FIG. 1 depicts a diagram illustrating tape drive system in which the present invention may be implemented.

With reference now to the figures and in particular with reference to FIG. 1, a diagram of a system is illustrated in which the present invention may be implemented. A tape drive system 100 is configured to receive a tape cartridge, such as tape cartridge 102, which contains a housing with a loop of tape wound on one or more reels in the housing. Tape drive system 100 may be used for a variety of applications. For example, tape drive system 100 may be used as a stand alone unit within a computer to provide backup. Additionally, tape drive system 100 also may be used within a robotic tape cartridge handling system to receive tape cartridges handled by robotic arms. In such a case, tape drive system 100 is a stand alone system in which a separate controller is present for handling the accessing of tapes. Information may be retrieved from such a system for use by a computer.

In this example, the tape in tape cartridge 102 contains servo control information being located in tracks on the tape. Typically, this information is a repeating servo pattern of magnetic flux transitions. Alternatively, optical servo tracks also may be found on the tape. Tape drive system 100 can read servo control information and generate a position signal used to control the position of an associated data read head within tape drive system 100. Servo control information may be written onto the tracks using a servo write head. Tape cartridge 102 may take a variety of formats, such as, for example, 8 mm, 4 mm, ¼ inch, and ½ inch formats.

Figure 2:
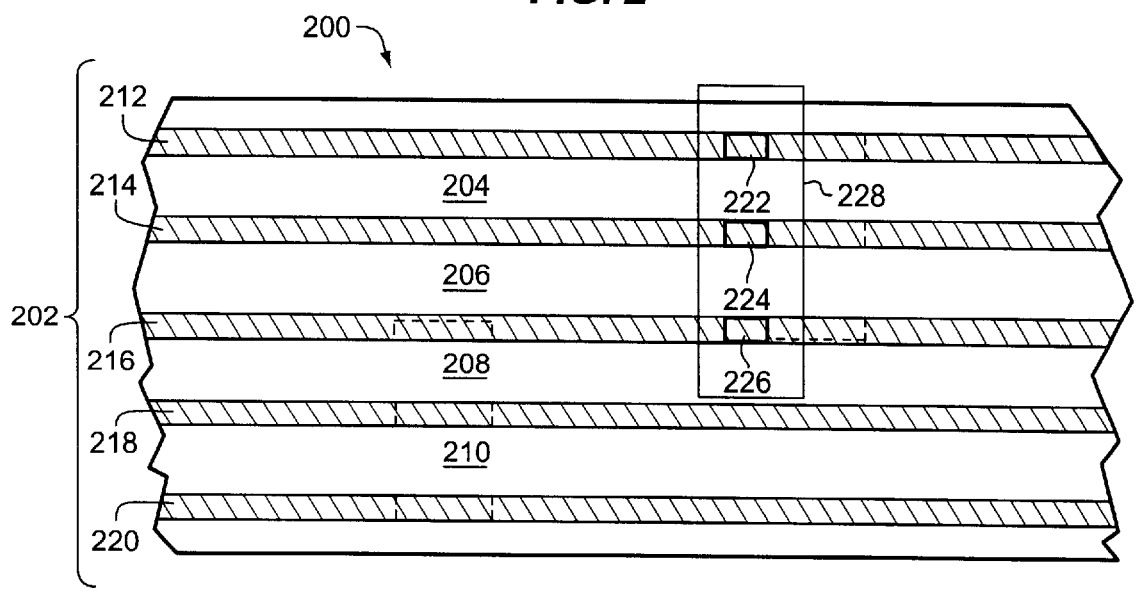
FIG. 2 depicts a schematic diagram illustrating tape and servo tracks in accordance with a preferred embodiment of the present invention.

With reference to FIG. 2, a diagram illustrating tape and servo tracks is depicted in accordance with a preferred embodiment of the present invention. Tape 200 has a width 202. Tape 200 illustrates data stripes 204–210 in which one or more data tracks are located. Also, servo tracks 212–220 are found on tape 200. As illustrated, servo tracks 212–220 are magnetic tracks, but may take other forms, such as, for example, optical tracks. In this example, five servo tracks are shown for purposes of illustrating the principles of the present invention. Depending on the implementation, other numbers of servo tracks may be found.

Servo read elements 222, 224, and 226 are located within head 228. These servo read elements or transducers, also referred to as "servo read heads", are found within a read/write head assembly 228 in this example. Servo read elements 222, 224, and 226 are positioned over servo tracks 212, 214, and 216 in these examples. These servo tracks may employ various patterns or frequency regions to allow precise tape-to-tape head positioning to allow for more accurate access of data from data tracks. The servo control system in a tape drive generates a position error signal based on differences in signal amplitudes generated by servo read elements 222, 224, and 226. Also, signal phase or timing difference data may be used to generate a position error signal. The position error signal is used to align the read/write head.

The present invention recognizes that although the read/write head may be aligned with the tracks at one location on tape 200, the alignment may change at another location due to changes in width 202. With high track densities, this type of dimensional variation may cause head transducer or head element misalignments resulting in data errors.

Figure 3:
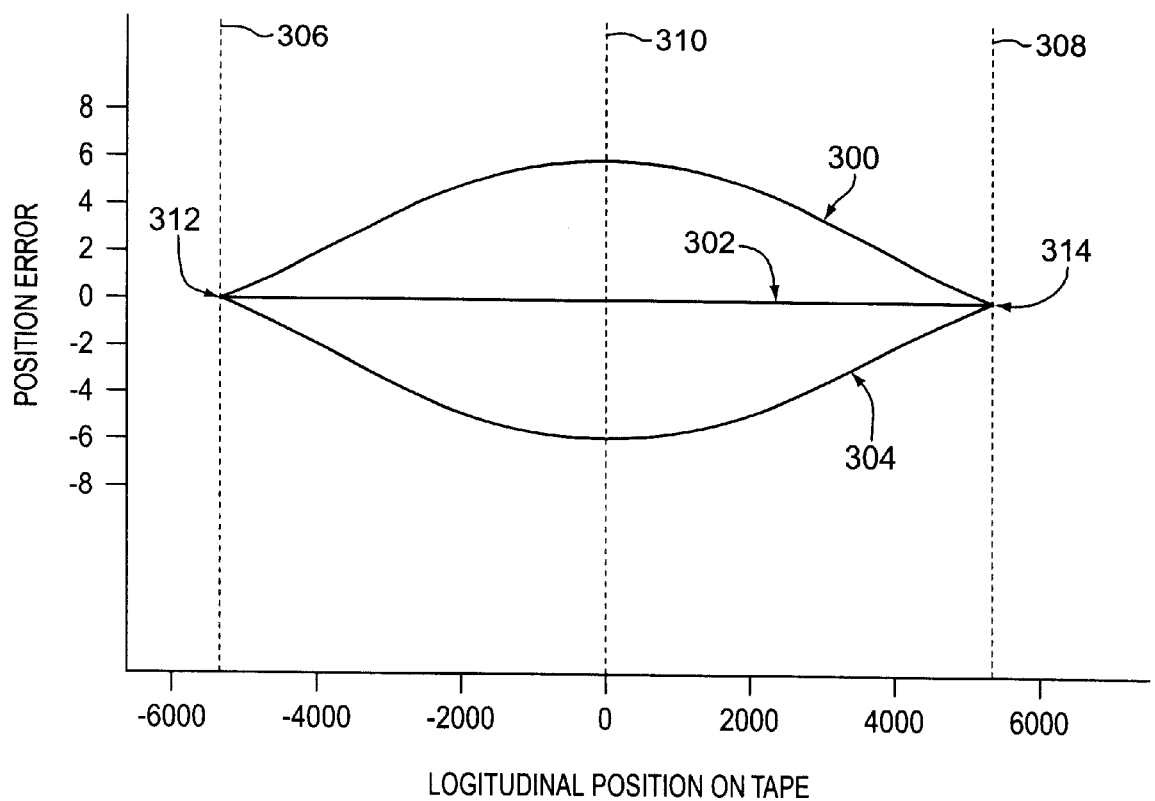
FIG. 3 depicts a schematic diagram illustrating servo position errors due to displacement of servo tracks in accordance with a preferred embodiment of the present invention.

Turning now to FIG. 3, a diagram of servo position errors due to displacement of servo tracks is depicted in accordance with a preferred embodiment of the present invention. In FIG. 3, the graph shows position error for a three servo track tape drive system in a two reel cartridge. In FIG. 3, line 300 represents data generated by servo element 222 in FIG. 2, line 302 illustrates data generated by servo read element 224 in FIG. 2, and line 304 shows data generated by servo read element 226 in FIG. 2. The tape, in this example, is located in a dual reel cartridge. Lines 300, 302, and 304 illustrate servo position errors due to displacement on a tape. The vertical axis indicates the amount of position or displacement error. Various units may be used, such as micrometers, micro-inches, or volts depending on the measurement made. The magnitude of the vertical axis varies depending on factors, such as, for example, the size of the cartridge and the reels, the materials used, and the dimensions of the tape. The horizontal axis identifies the longitudinal position. Specifically, the longitudinal position is an arbitrary, but fixed, measure of the physical locations lengthwise on the tape. The graph in FIG. 3 illustrates typical servo position error for a three-servo track system in a two reel cartridge. The beginning of each line at vertical line 306 represents the beginning or one end of the tape. Vertical line 308 represents the other end of the tape, while the vertical line 310 represents the middle of the tape. The symmetrical nature of the graph in FIG. 3 stems from the fact that equal amounts of tape are normally stored on each of the two reels. If, on the other hand, the tape is normally stored on one of the two reels, the profile will eventually approach the shape of either the left or right half of FIG. 3 depending onto which reel the tape is stored. The time constant of this change will depend on a variety of factors, such as environment, usage, spool size, and tape type.

In reading a tape, such as tape 200 in FIG. 2, the middle servo track, servo track 214, is positioned directly under servo read element 224. The upper servo track, servo track 212, and the lower servo track, servo track 216, are not aligned with servo read heads 222 and 226 except at crossover points 312 and 314 in FIG. 3. In FIG. 3, the illustrated signals are the inverse of the actual tape dimensions. These three lines illustrate a "bowtie" or "lips" effect, which is repeatable and predictable for a two-reel cartridge as the tape is played from one end to the other end.

In FIG. 3, although the tape is servo-written in a very controlled, parallel manner on the tape, compression and tension forces in the cartridge change the dimensions of this tape. In other words, in many cases the servo tracks written onto the tape from a large spool in which a length of tape is then placed on a reel in a cartridge. Servo tracks are written before spooling the tape onto a cartridge out of convenience so as to define the locations of the servo tracks in a very precise manner. Data is then written by a customer and the data tracks are referenced in location to the servo tracks to uniquely define the positions of the data tracks.

Figure 4:
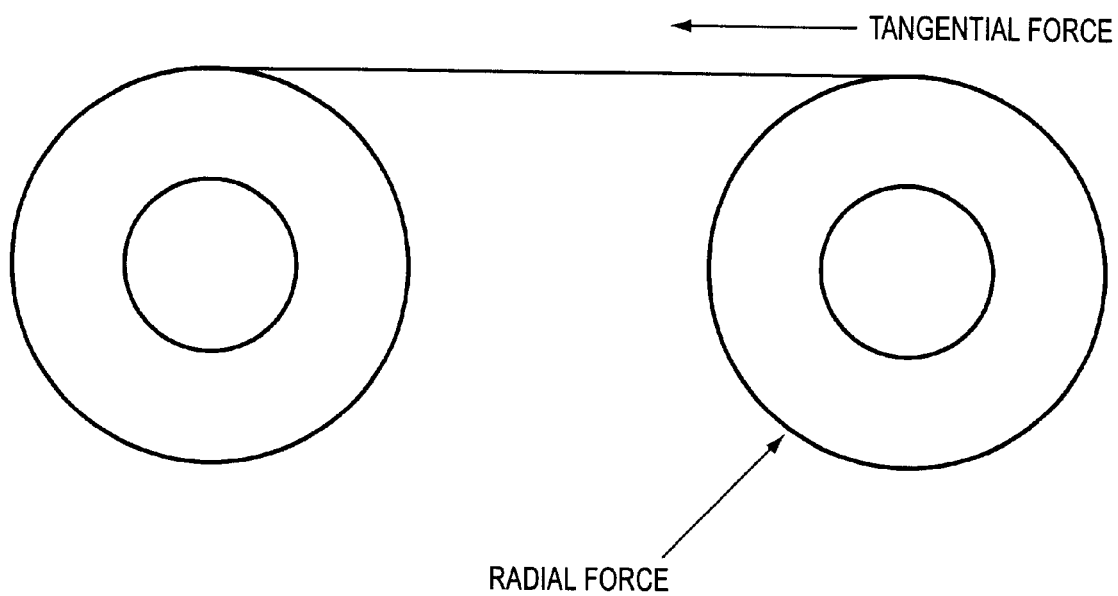
FIG. 4 depicts a schematic diagram illustrating compressive and tangential forces on a tape wrapped onto two spools in accordance with the present invention.

Referring now to FIG. 4, a schematic diagram illustrating compressive and tangential forces on a tape wrapped onto two spools is depicted in accordance with the present invention. When tape is wound around a reel, compressive forces tend to press out or increase the width of the tape. Compressive forces vary with position in the tape pack. These compressive forces, also referred to as radial forces, are decreased or removed when the tape is unwound from the reel. Although the compressive forces that cause the tape to widen are removed when the tape is unwound, the dimensional width change is residual. Tension and tangential forces also are present. These forces stretch the tape and cause the tape to become narrower. The interaction between the radial compressive and tangential, tensile forces give rise to the long term dimensional variations of spooled tape. As a result of the different forces applied to the tape, the width of the tape will change. These types of forces result in dimensional variations in the tape and thus, track to element displacements as shown by the servo position error signals illustrated in lines 300, 302, and 304.

Figure 5:
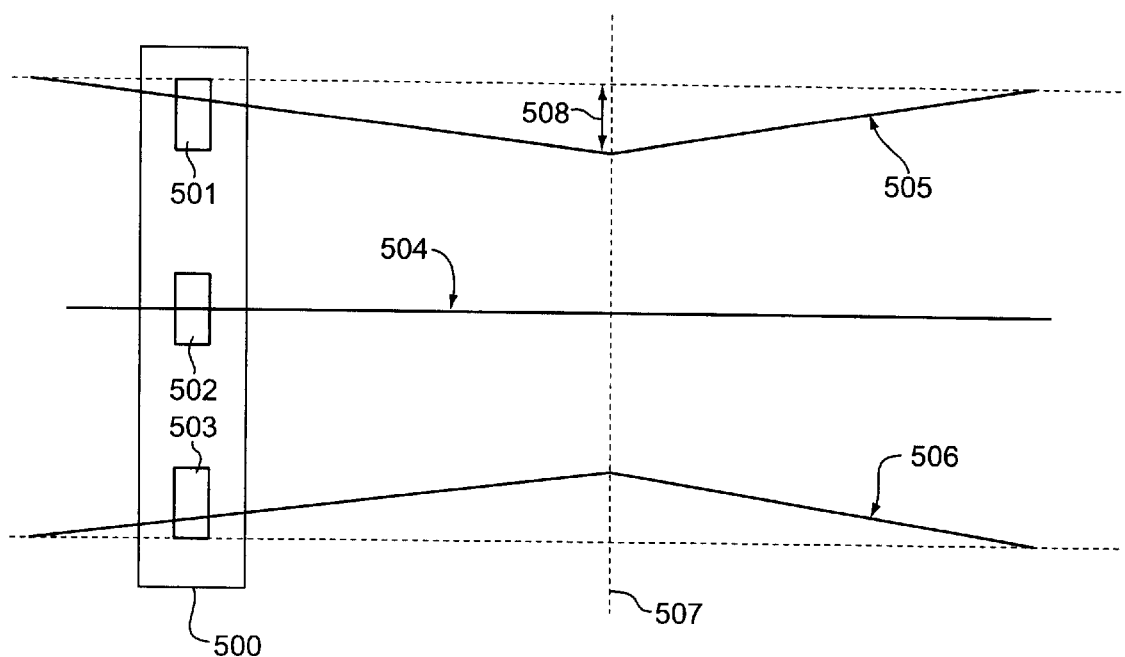
FIG. 5 depicts a schematic diagram illustrating the physical distortions in tape dimensions, resulting in a bowtie effect, in accordance with the present invention.

Referring to FIG. 5, a schematic diagram illustrating the physical distortions in tape dimensions, resulting in a bowtie effect, is depicted in accordance with the present invention. FIG. 5 shows three servo readers 501–503 positioned over three servo tracks 504–506. The upper reader 501 detects a roof shaped PES curve over then length of the tape, meaning the Position Error Signal (PES) 508 is positive at center of tape (COT) 507. Since the tape head 500 is solid, stable reference frame, the servo track 505 is low in relation to the upper servo reader 501. The opposite is true with the lower reader 503 and servo track 506. Therefore, the servo tracks 505 and 506 are distorted and the tape is narrower at COT 507 than at the ends. PES data 508 quantifies how much tape distortion there is.

The present invention is a software change to the tape drive servo system. The invention collects, filters, compresses, stores and processes component position error signal (PES) data in order to infer some of the physical characteristics of the tape. This invention will measure and quantify the amount of tape distortion and determine if the tape meets specifications. The servo system will then generate a warning for the customer to replace or retire tape that no longer meet specifications. The distortion data will also be stored long term and used to quantify tape longevity from a dimensional stability point of view.

The 9840 tape, for example, is pre-written with 5 servo tracks that split the tape into quarters and span the length of the tape. The 9840 read/write (R/W) head has three servo readers that are positioned over three of the 5 servo patterns at a time.

Each servo track is a pattern. Each servo reader reads information off of its respective servo pattern, which tells how well the head is aligned with the tape. When the alignment is imperfect, each pattern contains information that quantifies the misalignment of each reader. The displacement information, PES, is used by a closed loop head actuator control system to track acquire and track follow.

The component PES data is quantitative data of the relative positions of the servo readers and the servo tracks, as illustrated in FIG. 5. Since the head is a solid and the servo readers represent a stable frame of reference, the PES data effectively quantifies the distortion of the tape servo tracks along the length of the tape, which indicates how much the tape has distorted.

However, determining a tape's conformance to specifications involves more than merely reading PES data and drawing a clear cutoff point. The reliability of the PES data should also be considered. Several factors affect the reliability of PES data. The number of servo readers on a tape head can contribute to the confidence of PES data. The higher the number of servo readers, the higher the confidence in PES data. The length of tape actually read also contributes to the confidence of the PES data: the more data samples that actually read, the greater the reliability of PES data. For example, referring back to FIG. 5, if only a portion at either end of the tape is read, the PES data will understate the degree of distortion in tape geometry. On the other hand, if only the portion near the center of the tape is read, the degree of overall distortion would be overstated.

Other factors that contribute to confidence in PES data are dust contamination, the tolerance of tape head manufacture, tape tension variations, tolerance in servo pattern recordation, and the tolerance and reliability of the electronics in the tape drive. All of these factors should be considered when evaluating PES data.

The separate component PES data can be analyzed in different ways to produce a distortion score for a tape and determine the overall acceptability of the tape. For example, the data can be compressed and passed through digital filters. The data from individual components can be combined into a composite PES value. Another approach is to perform a linear regression on the slopes and offsets of the deviations values illustrated in FIG. 3. In addition, both of the above methods can be combined. The needs of the individual clients would be used to set the threshold specifications.

Determining whether a tape exceeds specifications may be a multi-step process, depending on the needs of the client and the level of confidence of the PES data. Early indications of excessive distortion may only flag suspicion. The history of PES readings on that particular tape would then be tracked. If the PES data shows a significant trend that exceeds specifications, more formal testing procedures can be run on the tape. In addition, the present invention can be used "on the fly" during normal operations, in which the tape drive will determine the acceptability of a tape.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for measuring magnetic tape track dimension distortion for a tape, comprising:

collecting position error signal (PES) data from servo tracks on a magnetic tape using tape head servo readers;

analyzing the PES data to determine tape dimension distortion;

comparing the tape dimension distortion to specifications for tape track dimension distortion acceptability; and determining if the tape meets specifications.

2. The method according to claim 1, further comprising defining specifications for tape track dimension distortion acceptability.

3. The method according to claim 1, wherein the step of analyzing the PES data further comprises adjusting the PES data for reliability factors.

4. The method according to claim 3, wherein the reliability factors used to adjust the PES data include:

number of servo readers on the tape head;

length of tape read;

tolerance of tape head manufacture;

tolerance and reliability of tape drive electronics;

tolerance of servo track recordation; and probability of dust contamination.

5. The method according to claim 1, wherein the step of analyzing the PES data further comprises combining the PES data from separate servo readers to produce a composite PES value.

6. The method according to claim 1, wherein the step of analyzing the PES data further comprises performing a linear regression on slopes and offsets of PES deviation values.

7. The method according to claim 1, wherein the step of determining if the tape meets specifications further comprises:

flagging a suspicious distortion signal from the tape during normal operations;

tracking a history of PES readings on the tape; and performing formal testing procedures if the history of PES readings shows a trend that exceeds specifications.

8. A system for measuring magnetic tape track dimension distortion for a tape, comprising:

a control unit connected to tape head servo readers, wherein the control unit collects position error signal (PES) data from servo tracks on a magnetic tape using the tape head servo readers;

a data processor connected to the control unit, wherein the data processor analyzes the PES data to determine tape dimension distortion;

a comparator unit connected to the data processor, wherein the comparator unit compares the tape dimension distortion to specifications for tape track dimension distortion acceptability and determines if the tape meets specifications.

9. The system according to claim 8, further comprising means for defining specifications for tape track dimension distortion acceptability.

10. The system according to claim 8, wherein the data processor that analyzes the PES data further comprises means for adjusting the PES data for reliability factors.

11. The system according to claim 10, wherein the reliability factors used to adjust the PES data include:

number of servo readers on the tape head;

length of tape read;

tolerance of tape head manufacture;

tolerance and reliability of tape drive electronics;

tolerance of servo track recordation; and probability of dust contamination.

12. The system according to claim 8, wherein the data processor that analyzes the PES data further comprises means for combining the separate PES data to produce a composite PES value.

13. The system according to claim 8, wherein the data processor that analyzes the PES data further comprises means for performing a linear regression on the slopes and offsets of the PES deviation values.

14. The system according to claim 8, wherein the comparator that determines if the tape meets specifications further comprises: means for flagging a suspicious distortion signal from a tape during normal operations;

a data storage unit for tracking the history of PES readings on the tape; and means for performing formal testing procedures if the history of PES readings shows a trend that exceeds specifications.

15. A computer program product in a computer readable medium for measuring magnetic tape track dimension distortion., the computer program product comprising:

instructions for collecting position error signal (PES) data from servo tracks on a magnetic tape using tape head servo readers;

instructions for analyzing the PES data to determine tape dimension distortion;

instructions for comparing the tape dimension distortion to specifications for tape track dimension distortion acceptability; and instructions for determining if the tape meets specifications.

16. The computer program product according to claim 15, further comprising instructions for defining specifications for tape track dimension distortion acceptability.

17. The computer program product according to claim 15, wherein the instructions for analyzing the PES data further comprise instructions for adjusting the PBS data for reliability factors.

18. The computer program product according to claim 17, wherein the reliability factors used to adjust the PBS data include:

number of servo readers on the tape head;

length of tape read;

tolerance of tape head manufacture;

tolerance and reliability of tape drive electronics;

tolerance of servo track recordation; and probability of dust contamination.

19. The computer program product according to claim 15, wherein the instructions for analyzing the PES data further comprise instructions for combining the separate PES data to produce a composite PES value.

20. The computer program product according to claim 15, wherein the instructions for analyzing the PES data further comprise instructions for performing a linear regression on the slopes and offsets of the PBS deviation values.

21. The computer program product according to claim 15, wherein the instructions for determining if the tape meets specifications further comprise:

instructions for flagging a suspicious distortion signal from a tape during normal operations;

instructions for tracking the history of PES readings on the tape; and instructions for performing formal testing procedures if the history of PES readings shows a trend that exceeds specifications.

* * * * *